United States Patent [19]

Hunter

[11] Patent Number: 5,179,874
[45] Date of Patent: Jan. 19, 1993

[54] HYDRAULIC CONTROL SYSTEM FOR VEHICULAR AUTOMATIC TRANSMISSIONS

[75] Inventor: Joseph H. Hunter, Carmel, Ind.

[73] Assignee: General Motors Corporation, Detroit, Mich.

[21] Appl. No.: 775,396

[22] Filed: Oct. 15, 1991

[51] Int. Cl.$^5$ ............................................. B60K 41/22
[52] U.S. Cl. ..................................... 74/733.1; 74/890; 192/3.58; 192/87.13
[58] Field of Search .................. 192/3.57, 3.58, 87.1, 192/87.11, 87.13; 74/890, 731.1, 732.1, 733.1

[56] References Cited

U.S. PATENT DOCUMENTS

| | | | |
|---|---|---|---|
| 4,376,473 | 3/1983 | Tomasek et al. | 192/3.58 |
| 4,391,166 | 7/1983 | Kubo et al. | 74/890 X |
| 4,603,603 | 8/1986 | Salmon | 74/868 |
| 4,855,913 | 8/1989 | Brekkestran et al. | 74/866 X |
| 4,936,430 | 6/1990 | Shikata | 192/87.13 X |
| 5,007,309 | 4/1991 | Lemon et al. | 192/3.58 X |
| 5,063,813 | 11/1991 | Lentz | 74/866 |

Primary Examiner—Leslie A. Braun
Assistant Examiner—William O. Trousdell
Attorney, Agent, or Firm—Mark A. Navarre

[57] ABSTRACT

The present invention provides a hydraulic control system for the automatic transmission of a vehicle. The control system utilizes only one pulse width modulating solenoid valve to provide modulated pressure (P2) to whichever of the torque transfer devices constitutes the single, on-coming torque transfer device required to effect a desired drive ratio. The control system includes a plurality of cascaded relay valves each of which is controlled by a respective solenoid valve. A pressure control gate is interposed between the single, pulse width modulating solenoid valve and the plurality of cascaded relay valves in order to provide modulated pressure (P2), or, selectively, main line pressure (P1) to the various torque transfer devices of the transmission. The solenoid valve are controlled to select which of the torque transfer devices shall be actuated by modulated pressure (P2) and which shall receive line pressure (P1). In addition, the control actuates a torque converter clutch with modulated pressure (P2) and maintains engagement thereof by main line pressure (P1) through selected drive ratios.

11 Claims, 11 Drawing Sheets

| DRIVE RATIO | SOLENOID VALVES | | | | | TORQUE TRANSFER DEVICES | | | | |
|---|---|---|---|---|---|---|---|---|---|---|
| | 21A | 21B | 21C | 21D | 21E | 37A | 37B | 37C | 37D | 37E |
| NEUTRAL/PARK | OFF | OFF | ON | OFF | OFF | OFF | OFF | OFF | OFF | OFF |
| FIRST | OFF | OFF | ON | OFF | OFF | ON | OFF | OFF | OFF | OFF |
| SECOND | OFF | OFF | ON | ON | STAGED | OFF | ON | OFF | OFF | OFF |
| THIRD | OFF | OFF | OFF | ON | ON | OFF | OFF | ON | OFF | OFF |
| FOURTH | OFF | ON | OFF | ON | ON | OFF | OFF | OFF | ON | OFF |
| FIFTH | ON | ON | OFF | ON | ON | OFF | OFF | OFF | OFF | ON |
| REVERSE | OFF | OFF | OFF | ON | OFF | OFF | OFF | ON | OFF | OFF |

FIG-11

HYDRAULIC CONTROL SYSTEM FOR VEHICULAR AUTOMATIC TRANSMISSIONS

TECHNICAL FIELD

The present invention relates generally to automatic transmissions for vehicles. More particularly, the present invention relates to hydraulic control systems for selectively actuating a plurality of torque transfer devices in the nature of brakes or clutches according to a progression controlled by an onboard computer in order to operate a vehicular automatic transmission through a full range of drive ratios, as well as for actuating a clutch for the torque converter in conjunction with a shift to a predetermined drive ratio.

Specifically, the present invention provides a hydraulic control system which utilizes a single pressure modulating solenoid valve to supply the modulated actuating hydraulic pressure to a plurality of torque transfer devices utilized in a vehicular transmission to effect the shift between successive drive ratios but also to supply the modulated actuating hydraulic pressure to a clutch for the torque converter which powers the automatic transmission.

BACKGROUND OF THE INVENTION

Vehicular transmissions generally include selectively engageable gear elements for providing multiple forward drive or speed ratios through which the output torque of the engine is applied to the drive wheels of the vehicle. In automatic transmissions, the gear elements which provide the various drive ratios are selectively activated, as through fluid-operated friction torque transfer devices, such as clutches and brakes. Thus, shifting from one drive ratio to another generally involves releasing (disengaging) the torque transfer device(s) associated with the current drive ratio and applying (engaging) the torque transfer device(s) associated with the desired drive ratio. Any torque transfer device to be released during a particular shift sequence is conventionally referred to as the "off-going" torque transfer device, while the torque transfer device to be applied during that same shift sequence is referred to as the "on-coming" torque transfer device. High quality shifts are achieved only when the releasing and applying operations are properly timed and executed.

Conventionally, the shifting control effected by an automatic transmission is performed in conjunction not only with a logic control map but also various inputs which reflect such system parameters as the drive ratio at which the vehicle is presently operating, engine throttle position and engine torque. Signals representative of the various system parameters are processed in an onboard microprocessor to determine when a shift is in order and to actuate, in accordance with the logic control map, electronically operated valves in the hydraulic control system which respond to the signals received from the microprocessor in order to effect the required engagement and/or disengagement (and in the proper order) of the appropriate torque transfer devices necessary to secure the desired drive ratio changes to the output shaft of the transmission.

Conventionally, a pulse width pressure modulating solenoid valve may be employed in conjunction with each torque transfer device required to select the various drive ratios provided by an automatic transmission in order to eliminate the various problems associated with the overlap between the engagement and disengagement of the appropriate torque transfer devices. An exemplary installation of such an arrangement is disclosed in U.S. Pat. No. 4,790,513 issued to Davis et al. on Dec. 13, 1988, and assigned to the assignee of the present invention.

Installations in which a single pulse width modulating solenoid valve is employed in conjunction with a plurality of torque transfer devices are also known. See, for example, U.S. Pat. No. 4,603,603 which issued to Salmon on Aug. 5, 1985, as well as U.S. patent application Ser. No. 07/382,456, filed on Jul. 20, 1989, both of which are assigned to the assignee of the present invention. Pulse width pressure modulating solenoid valves are expensive to make and therefore add considerable cost to the hydraulic control system when an individual modulating valve is employed to control the engagement and disengagement of each torque transfer device in an automatic transmission.

SUMMARY OF THE INVENTION

It is, therefore, a primary object of the present invention to provide an improved system for controlling automatic transmissions.

It is another object of the present invention to provide an improved hydraulic control system, as above, which utilizes only a single pulse width pressure modulating solenoid valve to effect engagement and disengagement of the multiple torque transfer devices required to select the several drive ratios provided by an automatic transmission.

It is a further object of the present invention to provide an improved hydraulic control system, as above, which provides for the selective actuation of a torque converter clutch in order to eliminate slip between the impeller and the turbine in the torque converter, except when desired—such as in neutral, park, reverse and the lower drive ranges of the transmission.

It is yet another object of the present invention to provide an improved hydraulic control system, as above, which utilizes a single modulating solenoid valve to initiate not only each of the multiple torque transfer devices employed to effect shift control in the transmission but also the clutch for the torque converter at a modulated pressure.

It is a still further object of the present invention to provide an improved hydraulic control system, as above, wherein the torque transfer devices are operated by relay valves cascaded such that inadvertent downshifts are precluded.

It is an even further object of the present invention to provide an improved hydraulic control system, as above, wherein four cascaded relay valves are employed to control the shift through five drive ratios and wherein the torque converter clutch may be engaged during the second drive ratio and continue through the fifth drive ratio.

These and other objects of the invention, as well as the advantages thereof over existing and prior art forms, which will be apparent in view of the following detailed specification, are accomplished by means hereinafter described and claimed.

In general, a hydraulic control system embodying the concepts of the present invention utilizes a single, pulse width modulating solenoid valve in order to actuate two separate hydraulic subsystems. The first hydraulic subsystem utilizes a pressure control gate and a plurality of hydraulically operated relay valves interconnected in a cascaded arrangement to effect selective operation of a plurality of torque transfer devices in the transmission to shift between successive drive ratios. The relay valves are controlled by a plurality of solenoid valves which are, in turn, controlled electrically by signals from a preprogrammed, onboard microprocessor.

The second hydraulic subsystem utilizes a separate pressure control gate and a solenoid operated spool-type control valve to effect the desired operational states for a clutch in the torque converter. The solenoid which operates the control valve is also electrically activated by signals from the preprogrammed onboard microprocessor.

The microprocessor controlled solenoid valves of the first subsystem receive main line hydraulic pressure from a transmission pump to operate selected relay valves in accordance with control signals from the preprogrammed onboard microprocessor. The pressure control gate of the first subsystem receives main line pressure from the transmission pump and modulated pressure from the modulating solenoid. The appropriate pressure is fed through the cascaded relay valves to the specific torque transfer device(s) necessary to achieve the desired drive ratio.

The pressure control gate of the second subsystem also receives main line hydraulic pressure from the transmission pump and modulated pressure from the modulating solenoid. The appropriate pressure then passes to a torque converter clutch control valve which opens and closes in response to the microprocessor controlled solenoid valve for the torque converter clutch control valve. When this solenoid valve is turned "on" in response to a signal from the microprocessor, fluid pressure flows to, and effects engagement of, the torque converter clutch.

One exemplary embodiment of a hydraulic control system embodying the concepts of the present invention is deemed sufficient to effect a full disclosure of the subject invention, and an exemplary embodiment thereof is shown by way of example in the accompanying drawings and is described in detail without attempting to show all of the various forms and modifications in which the invention might be embodied; the invention being measured by the appended claims and not by the details of the specification.

BRIEF DESCRIPTION OF THE DRAWINGS

FIG. 11 is a logic map for the hydraulic control system represented in the previous figures, said logic map being presented on tabular form.

DESCRIPTION OF AN EXEMPLARY EMBODIMENT

Figure 1:
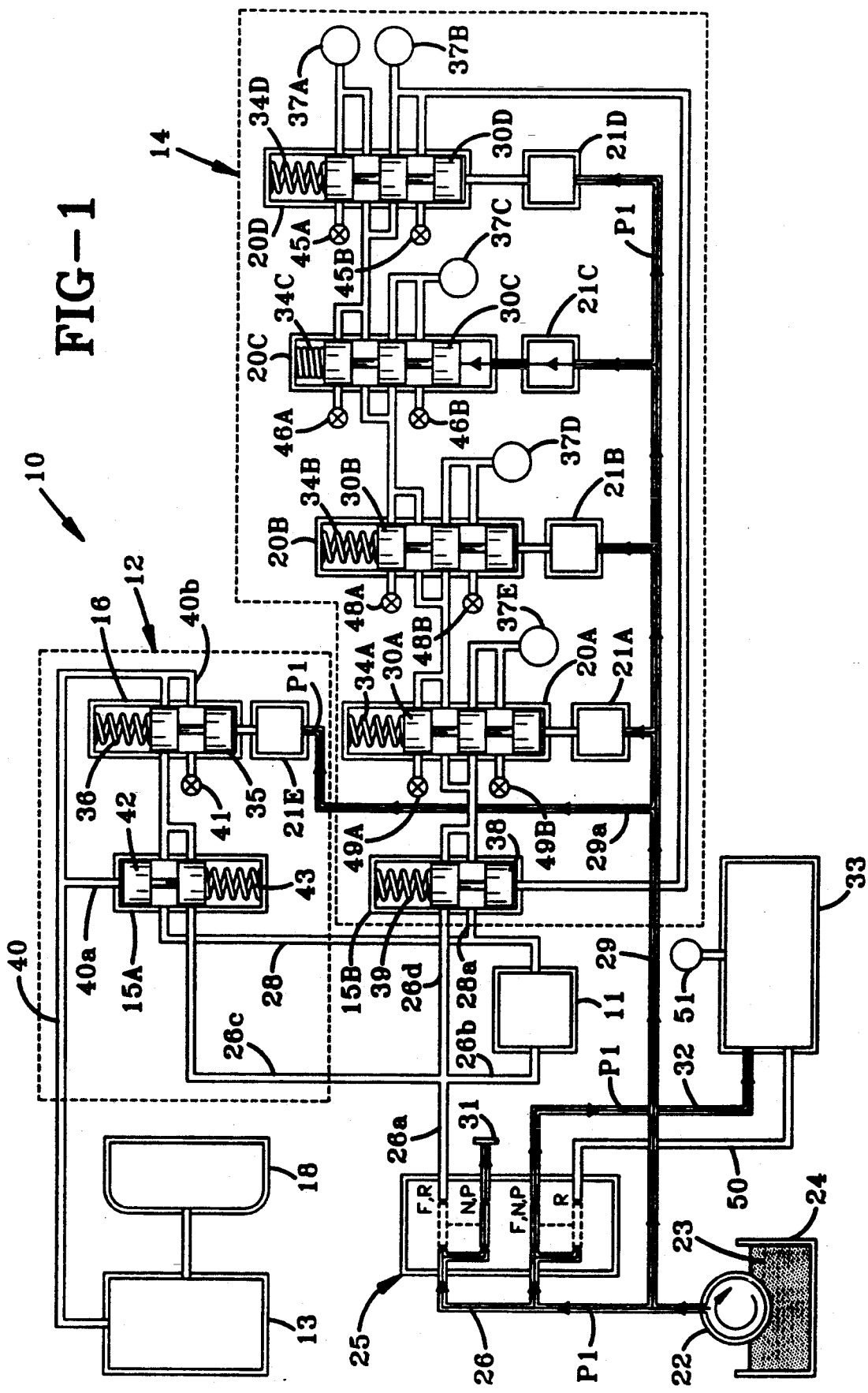
FIG. 1 is a schematic representation of a hydraulic control system embodying the concepts of the present invention and representing the position or condition of the manually operated shift selector valve assembly, the modulating solenoid, the pressure control gates, the subassembly for controlling the torque converter clutch and the transmission shift range control subassembly, as well as those conduits through which hydraulic fluid flows or hydraulic pressure is transferred, to effect the neutral/park condition.

A hydraulic control system embodying the concepts of the present invention, and being particularly adapted for use in conjunction with automatic transmissions for vehicles, is identified generally by the numeral 10 on the accompanying drawings. The hydraulic control system 10 is particularly unique in that it utilizes only a single pulse width modulating solenoid 11 for control of two separate subsystems—a converter clutch control subsystem 12, which operates a torque converter clutch 13, and a shift range control subsystem 14, which operates a vehicular transmission (not shown). Both subsystems 12 and 14 will be hereinafter more fully explained, but for the present one may refer to FIG. 1 wherein the two subsystems are outlined with dashed lines.

From the start it should be understood that because of the expense of a modulating solenoid valve, a considerable monetary savings is represented when only one such solenoid valve is required for a transmission capable of providing five forward drive ratios and a single reverse drive ratio.

Briefly, subsystem 12, which operates the torque converter clutch 13, includes not only a pressure control gate 15A but also a torque converter clutch control valve 16. The components of the converter clutch control subsystem 12 communicate with each other, with the torque converter clutch 13 and with a main line pressure P1 source, as well as a modulated pressure P2 source by means of a plurality of conduits that will be hereinafter more fully identified.

The torque converter clutch 13 selectively conjoins the impeller and turbine (neither of which is shown on the drawings) of a torque converter 18 by structure that is well known to the art, an example of which is described in U.S. Pat. No. 4,049,093 which issued on Sep. 20, 1977 to Vukovich et al. and which is also owned by the assignee of the subject invention.

The transmission shift range subsystem 14 includes a pressure control gate 15B and a cascaded series of relay valves 20A through 20D which are actuated by solenoid valves 21A through 21D, respectively, to operate torque transfer devices in the manner necessary for the automatic transmission to provide sequential shifting through a plurality of drive ratios, as is also hereinafter more fully explained.

As may be apparent from the preceding paragraph, and as will appear in the detailed description which follows, a particular structural member, component or arrangement may be employed at more than one location. When referring generally to that type of structural member, component or arrangement a common numerical designation shall be employed. However, when one of the structural members, components or arrangements so identified is to be individually identified it shall be referenced by virtue of an upper case, or capital, letter suffix employed in combination with the numerical designation utilized for general identification of that structural member, component or arrangement.

Thus, there are at least two pressure control gates which are generally identified by the numeral 15, but the two, specific, individual pressure control gates are, therefore, identified as 15A and 15B in the specification and on the drawings. As such, the pressure control gate 15A is associated with the converter clutch control subsystem 12 for the torque converter clutch 13, and the pressure control gate 15B is associated with the transmission shift range subsystem 14. This same suffix convention shall be employed throughout the specification, as should also be apparent from the designation of the relay valves 20 and the solenoid valves 21, also introduced in the preceding paragraph. A lower case letter suffix is employed to identify similar, or related, items, as distinct from identical items.

The transmission shift range control subsystem 14 will be described as though it were operatively connected to a prior known transmission (not shown) such as in U.S. Pat. No. 5,009,116, issued Apr. 23, 1991, to Ordo et al. Similarly, the converter clutch control subsystem 12 will be described as though it were operatively connected to a prior known torque converter clutch such as described in U.S. Pat. No. 4,177,885 issued Dec. 11, 1979, to Phillip J. Ross, and directed to a "Torque Converter and Lock-up Clutch." Both the aforesaid patents are owned by the assignee of the present invention.

Referring initially to FIG. 1, main line pressure P1 is provided by a transmission pump 22 which supplies hydraulic fluid 23 from a reservoir 24. In general, main line pressure P1 is fed from the pump 22 to—and, in most situations, through—the shift selector valve assembly 25.

Figure 2:
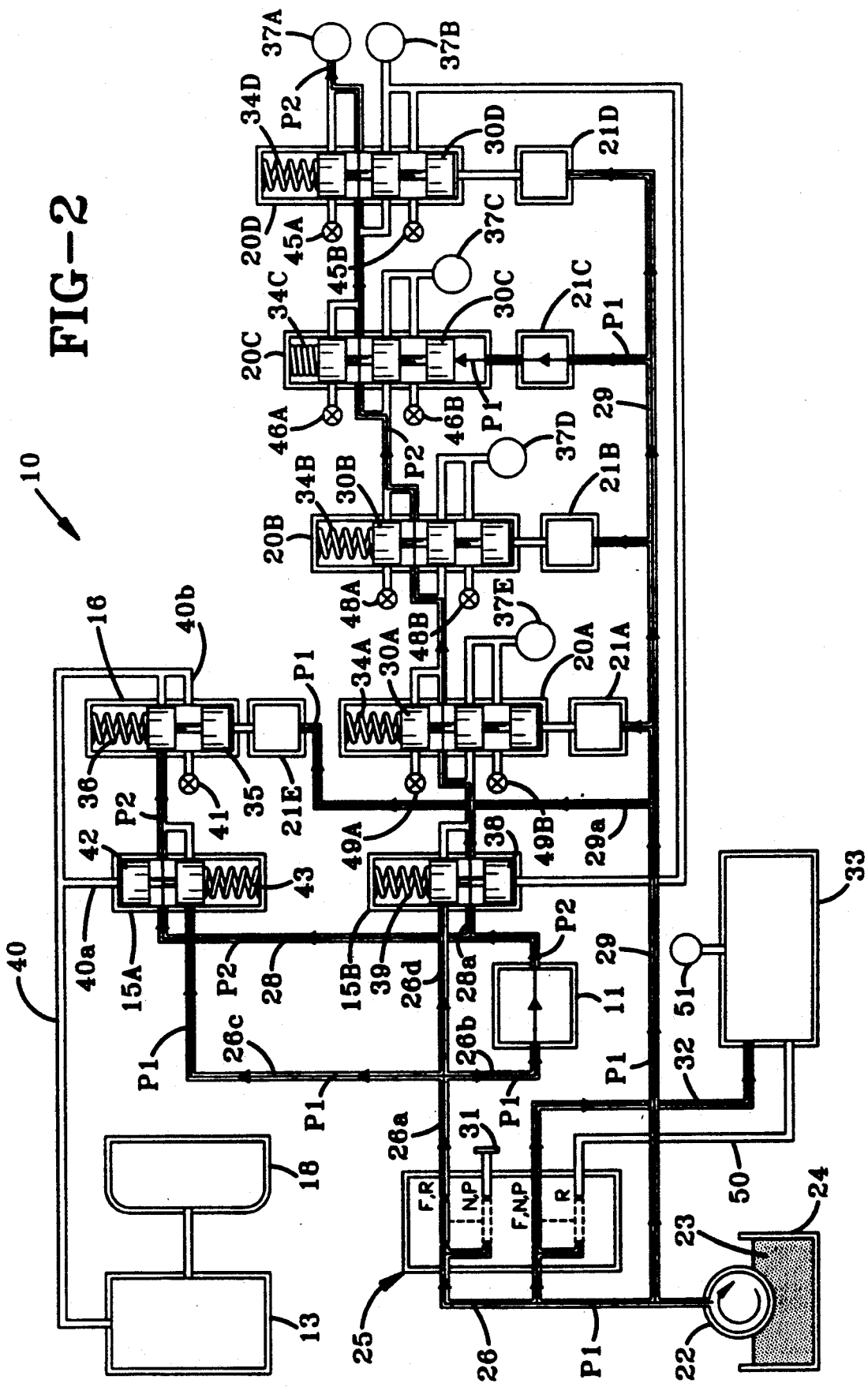
FIG. 2 is a further schematic representation of the hydraulic control system depicted in FIG. 1 but representing the position or condition of the manually operated shift selector valve assembly, the modulating solenoid, the pressure control gates, the subassembly for controlling the torque converter clutch and the transmission range control subassembly, as well as those conduits through which hydraulic fluid flows or hydraulic pressure is transferred, to effect the first drive ratio.

Main line pressure P1 may, therefor, be directed from the pump 22 to the shift selector valve assembly 25 by virtue of a conduit 26. As shown in FIG. 2, wherein the main line pressure P1 flows through the shift selector valve assembly 25, a conduit extension 26a projects outwardly from the shift selector valve assembly 25, and diverges into three branch conduits 26b, 26c and 26d. The first branch conduit 26b communicates main line pressure P1 to the modulating solenoid 11. The second branch conduit 26c communicates main line pressure P1 to pressure control gate 15A, and the third branch conduit 26d communicates main line pressure P1 to pressure control gate 15B. Modulated pressure P2 from solenoid 11 is communicated to the pressure control gate 15A by conduit 28, and pressure P2 from the modulating solenoid 11 is simultaneously communicated to pressure control gate 15B by branch conduit 28a.

With reference to the transmission shift range subsystem 14, and as will be hereinafter explained in further detail, modulated pressure P2 will be permitted to flow through the cascaded relay valves 20 to effect actuation of the various torque transfer devices 37 in accordance with the drive ratio selected by an on-board microprocessor (not shown). On specific occasions main line pressure P1, depending upon the state of the pressure control gate 15B, will be transmitted through the cascaded relay valves 20 to effect certain desired results, as will also be hereinafter more fully explained.

With continued reference to FIG. 1, main line pressure P1 is provided through conduit 29 to a plurality of solenoid valves 21A through 21D. A branch conduit 29a communicates main line pressure P1 to solenoid valve 21E. The solenoid valves 21A-21D are themselves operated by the on-board microprocessor to effect the desired positioning of each spool member 30A-30D within its respective relay valve 20A-20D. The solenoid valve 21E is also operated by the on-board microprocessor to position the spool member 35 within converter clutch control valve 16. The microprocessor, as is conventional practice, receives various vehicle operational inputs in response to which the solenoid valves 21 are actuated for selection of the proper transmission drive ratio.

As will now be described, the modulating solenoid 11, the converter clutch control subassembly 12 and the transmission shift range subassembly 14 may be appropriately operated in concert not only to control the engagement and disengagement of the torque converter clutch 13 but also to select the desired transmission drive ratio.

Operation of the hydraulic control system 10 will be described with reference to the logic table depicted in FIG. 11. The logic table maps the state of the solenoid valves 21A through 21E (identified along the horizontal coordinate of the table) for each drive ratio (identified along the vertical coordinate of the table).

FIG. 1 represents the manual shift selector valve assembly 25 in the neutral/park position. In the neutral/park position of the shift selector valve assembly 25, main line pressure P1 is blocked from access to extension conduit 26a. That is, neither main line pressure P1 nor modulated pressure P2 have access to either of the pressure control gates 15 inasmuch as the shift selector valve assembly 25 blocks the flow of main line pressure P1 at port 31 associated with the shift selector valve assembly 25. The shift selector valve assembly 25 does, however, allow main line pressure P1 to flow therethrough and into conduit 32 which communicates with the forward-reverse shift fork assembly 33 associated with the transmission in order to actuate the "neutral/park" mode thereof, as is well known to the art.

Continued reference to FIG. 1 will provide a general overall familiarization with the structural components of the hydraulic control system 10. That is, the pressure control gate 15B, the converter clutch control valve 16 and each of the relay valves 20 include a spool member, or piston, that is biased downwardly (as represented in the drawings) by individual compression springs. Specifically, the spool members 30A through 30D in the respective relay valves 20A through 20D are each biased by compression springs 34A through 34D, respectively. The spool member 35 in the converter clutch control valve 16 is similarly biased downwardly by a compression spring 36, and the spool member 38 in the pressure control gate 15B is biased downwardly by a compression spring 39.

As shown in FIG. 1 the solenoid valves 21A through 21E may each be set to preclude the passage of pressurized fluid therethrough. This condition allows the spool member 35 in the converter clutch control valve 16 to be biased by the compression spring 36 such that the conduit 40 which communicates between the torque converter clutch 13 and the converter clutch control valve 16 will communicate—via branch conduit 40b—with the exhaust port 41 through the converter clutch control valve 16, thereby negating the existence of any operating pressure within the torque converter clutch 13. This condition precludes engagement of the torque converter clutch 13.

The spool member 42 in pressure control gate 15A is biased upwardly (as viewed in FIG. 1) by a compression spring 43 such that main line pressure P1 would be blocked by the body of the spool member 42 from passing through the pressure control gate 15A. On the other hand, the biased position of the spool member 42 would permit modulated pressure P2 to pass through the pressure control gate 15A, only to be blocked by the body portion of the spool member 35 in the converter clutch control valve 16. The conditional phraseology in this paragraph is employed inasmuch as the disposition of the shift selector valve assembly 25 in the neutral/park condition (FIG. 1) does not permit main line pressure P1 to access either of the pressure control gates 15. Because main line pressure P1 is also not permitted to access the modulating solenoid valve 11 in the neutral/park condition of the shift selector valve 25, modulated pressure P2 is similarly unavailable to the pressure control gates 15.

To effect a shift from the neutral/park condition (FIG. 1) to the first drive ratio (FIG. 2), the operator must select the drive mode of the shift selector valve assembly 25. As shown in FIG. 2, this shift permits main line pressure P1 to access both the pressure control gates 15 as well as the modulating solenoid 11 through extension conduit 26a and conduit branches 26b, 26c and 26d, as previously explained.

FIG. 2 represents the disposition of all the components within the hydraulic system 10 in response to the shift from neutral into the first drive ratio. Accordingly, modulated pressure P2 will pass from the modulating solenoid 11 through conduit 28a and into the pressure control gate 15B. Sequentially, thereafter, the modulated pressure P2 will pass through each of the successively cascaded relay valves 20A through 20D, as shown by the arrows, to actuate the torque transfer device 37A. Actuation of the torque transfer device 37A effects the shift into the first drive ratio. It will also be observed from FIG. 2, that neither main line pressure P1 nor modulated pressure P2 is permitted access to the torque converter clutch 13. As such, the torque converter clutch 13 remains deactivated while the transmission is in the first drive ratio.

Figure 3:
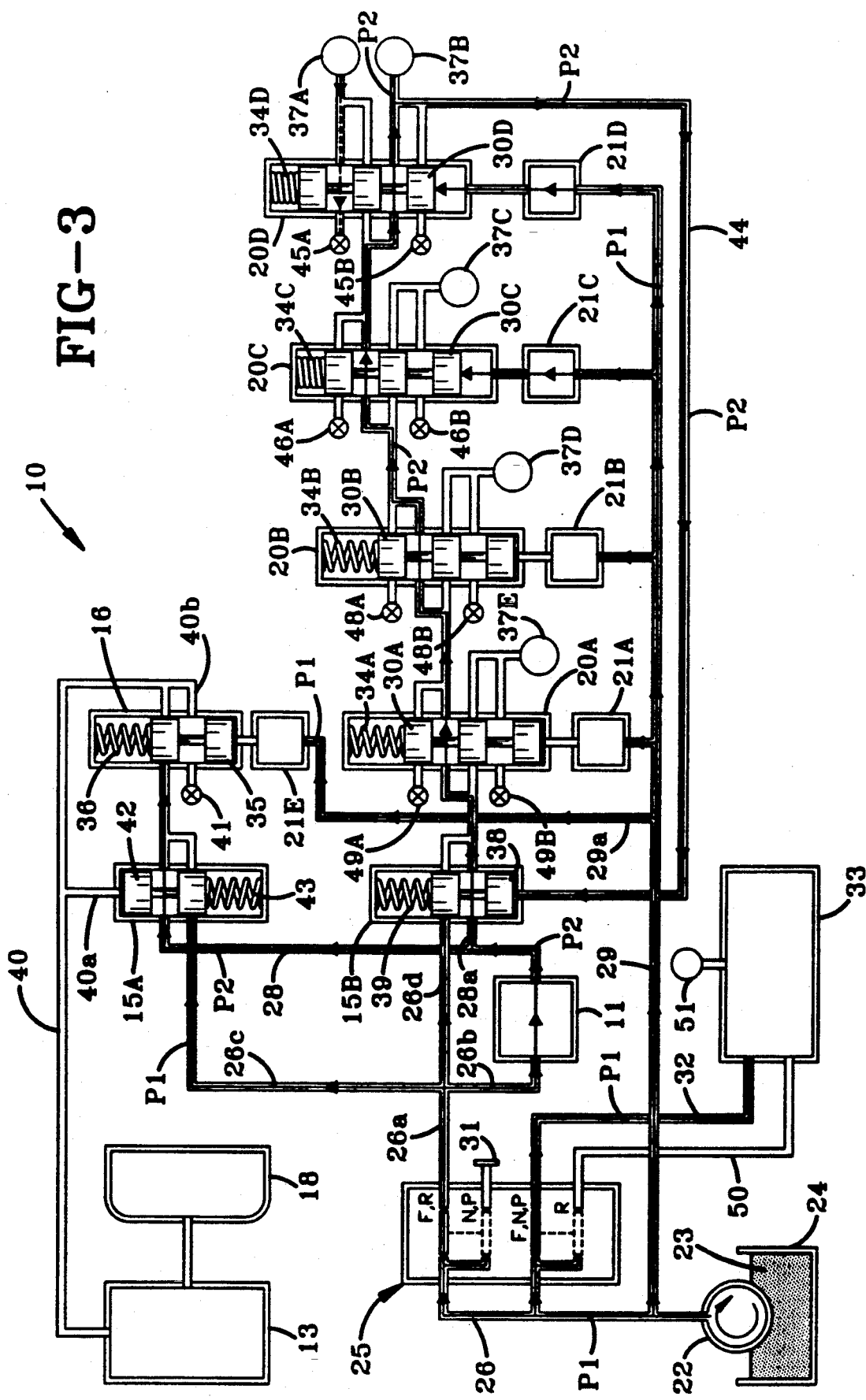
FIG. 3 is a further schematic representation of the hydraulic control system depicted in FIGS. 1 and 2 but representing the position or condition of the manually operated shift selector valve assembly, the modulating solenoid, the pressure control gates, the subassembly for controlling the torque converter clutch and the transmission range control subassembly, as well as those conduits through which hydraulic fluid flows or hydraulic pressure is transferred, to effect the initial stage of implementing the second drive ratio by modulated pressure.

To initiate a shift from the first drive ratio (FIG. 2) to the second drive ratio (FIGS. 3 through 5) the logic map (FIG. 11) indicates that solenoid valve 21D is activated to permit main line pressure P1 from the transmission pump 22 to flow via conduit 29, to and through solenoid valve 21D and into the relay valve 20D in order to translate the spool member 30D against the biasing action of the compression spring 34D to the position depicted in FIG. 3. It must be appreciated, that FIG. 3 represents the initial disposition of all the components within the subsystems 12 and 14 of the hydraulic system 10 in response to the shift into the second drive ratio.

With the spool member 30D translated upwardly to the position depicted in FIG. 3, the hydraulic pressure which had activated torque transfer device 37A is vented through relay valve 20D to exhaust port 45A, as shown by the chain line arrows in that figure. Simultaneously, modulated pressure P2 will pass from the modulating solenoid valve 11 through the pressure control gate 15B and each of the successively cascaded relay valves 20A through 20D, as shown by the solid line arrows, to actuate the torque transfer device 37B. It is the actuation of the torque transfer device 37B which initiates the shift in the second drive ratio.

Simultaneously, with the initiation of the second drive ratio, as described immediately above, modulated pressure P2 will begin to flow through feedback conduit 44 to the pressure control gate 15B, as depicted in FIG. 3. When the modulated pressure acting on the torque transfer device 37B reaches a specified percentage of its maximum value, the hydraulic pressure within feedback conduit 44 will be sufficient to overcome the biasing pressure of spring 39 to move spool member 38 in the pressure control gate 15B upwardly from the position depicted in FIG. 3 to the position shown in FIG. 4. The upward displacement of spool member 38 permits full main line pressure P1 to flow through the cascaded relay valves 20A, 20B, 20C and 20D to torque transfer device 37B. By employing the main line pressure P1 in this manner, the modulated pressure P2 is not required to maintain the torque transfer device 37B in its actuated condition while simultaneously attempting to actuate the torque converter clutch 13.

Figure 4:
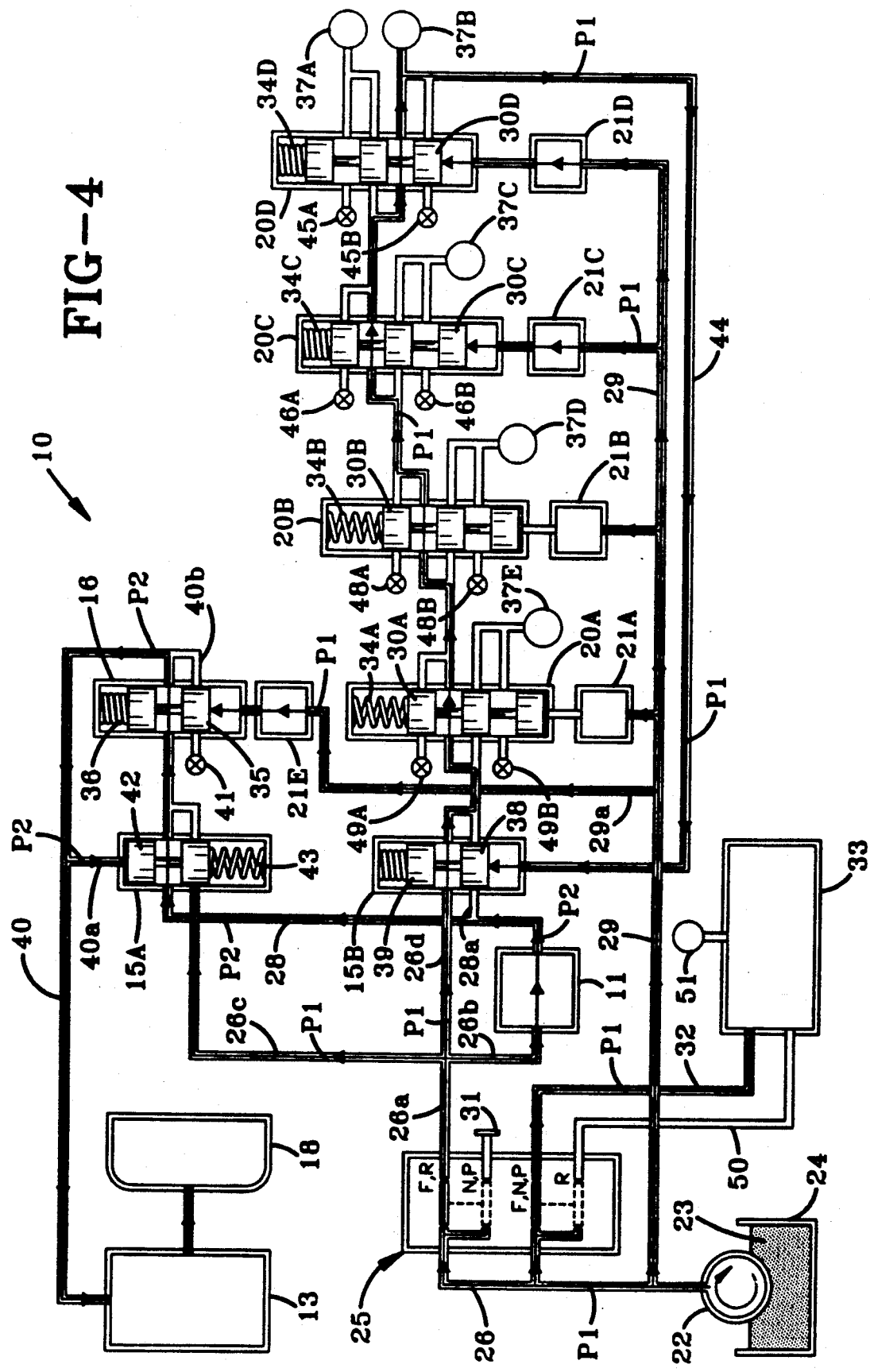
FIG. 4 is a further schematic representation of the hydraulic control system similar to that depicted in FIG. 3 but representing the position or condition of the manually operated shift selector valve assembly, the modulating solenoid, the pressure control gates, the subassembly for controlling the torque converter clutch and the transmission range control subassembly, as well as those conduits through which hydraulic fluid flows or hydraulic pressure is transferred, to effect initial actuation of the torque converter clutch by modulated pressure and maintaining engagement of the torque transfer device responsible for implementation of the second drive ratio with main line pressure.

After the second drive ratio is achieved, and based on lockup shift schedule computations, solenoid valve 21E is actuated to permit full main line pressure P1 to move the spool 35 in the converter clutch control valve 16 upwardly (as viewed in FIG. 4). The upward displacement of the spool 35 permits modulated pressure P2 to pass from conduit 28 through the pressure control gate 15A, through the converter clutch control valve 16 and through the conduit 40 to the torque converter clutch 13 which is thereby engaged by modulated pressure P2. At the same time, the modulated pressure P2 passes from conduit 40 into feedback branch 40a.

Figure 5:
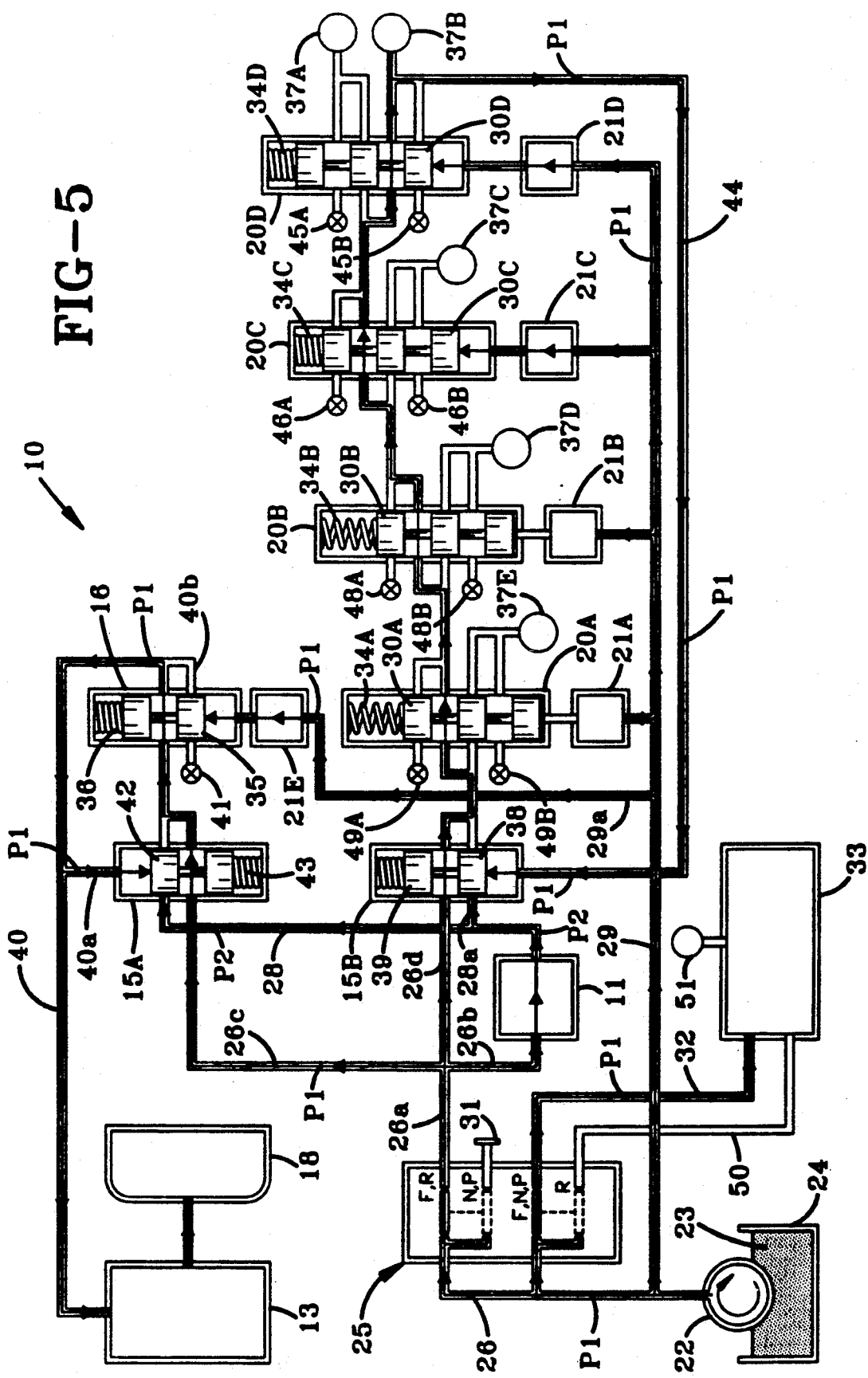
FIG. 5 is a further schematic representation of the hydraulic control system similar to that depicted in FIGS. 3 and 4 but representing the position or condition of the manually operated shift selector valve assembly, the modulating solenoid, the pressure control gates, the subassembly for controlling the torque converter clutch, and the transmission range control subassembly, as well as those conduits through which hydraulic fluid flows or hydraulic pressure is transferred, to effect full operative engagement of the torque converter c with main line pressure while continuing to maintain the second drive ratio.

When the pressure within the torque converter clutch 13 reaches a predetermined value, that pressure will be sufficient to overcome the biasing force applied to the spool member 42 by the compression spring 43 in order to drive the spool member 42 in the pressure control gate 15A downwardly so that the modulated pressure P2 which initiated actuation of the torque converter clutch 13 is replaced by full main line pressure P1, as viewed in FIG. 5.

To effect a shift from the second drive ratio (FIG. 5) to the third drive ratio (FIG. 6), as is apparent from the logic map in FIG. 11, solenoid valve 21C is deactivated. Immediately upon deactivating solenoid valve 21C, the compression spring 34C moves the spool member 30C downwardly, which permits the hydraulic fluid which actuated the torque transfer device 37B to pass through the relay valve 20C and vent through the exhaust port 46A. The main line hydraulic fluid pressure P1, which maintained the spool member 38 in the pressure control gate 15B against the biasing action of the compression spring 39, also vents through feedback conduit 44 which communicates with the exhaust port 46A when the spool member 30C in relay valve 20C is disposed in the position represented in FIG. 6.

Figure 6:
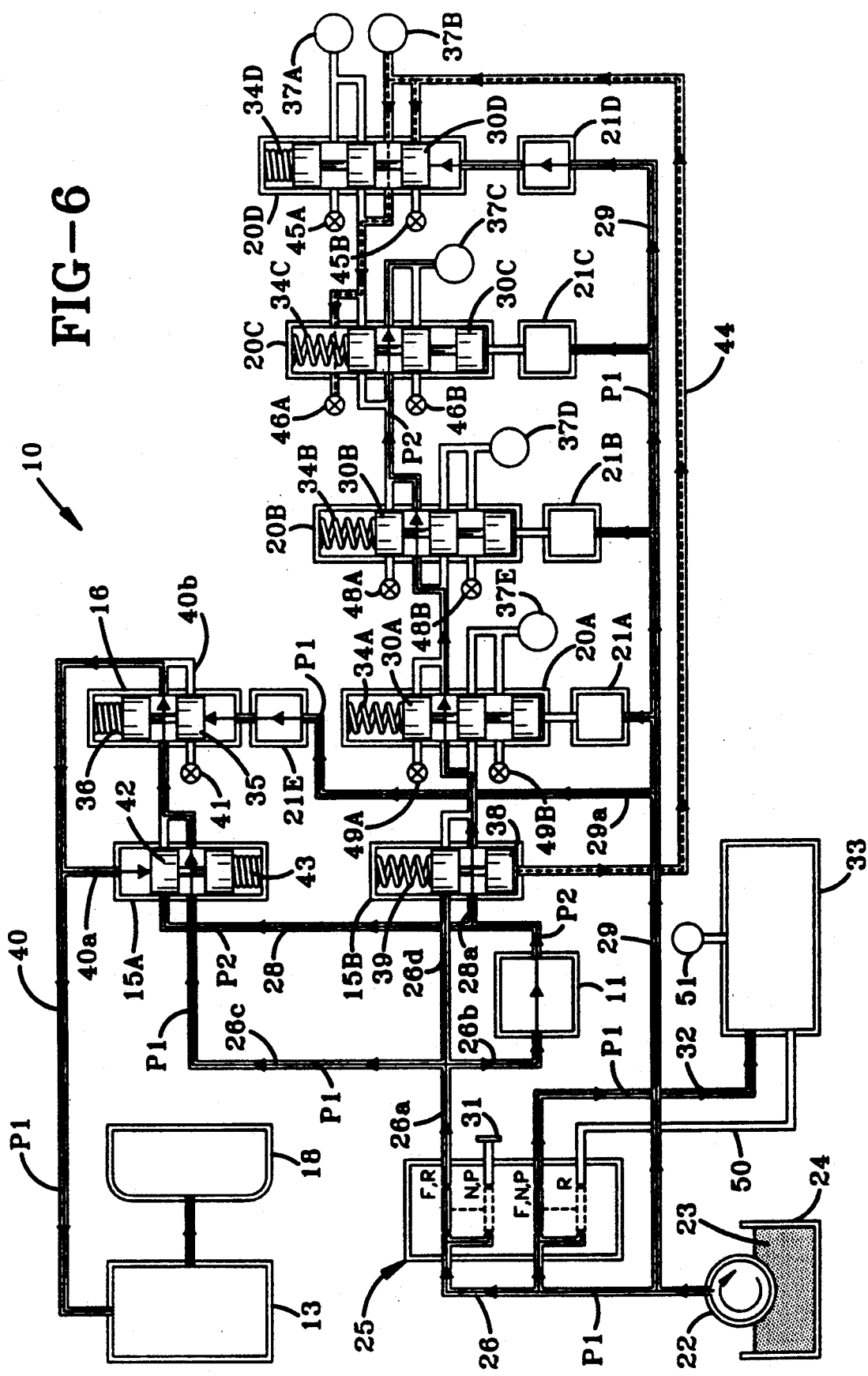
FIG. 6 is a further schematic representation of the hydraulic control system depicted in the previous figure but representing the position of the manually operated shift selector valve assembly, the modulating solenoid, the pressure control gates, the subassembly for controlling the torque converter clutch and the transmission range control subassembly, as well as those conduits through which hydraulic fluid flows or hydraulic pressure is transferred, to effect a shift to the third drive ratio.

As such, when solenoid valve 21C is released, modulated pressure P2 will pass through the pressure control gate 15B and the cascaded relay valves 20A-20C to actuate torque transfer device 37C, as represented by the solid line arrows in FIG. 6. The shift to the third drive ratio has no direct effect on the torque converter clutch 13 inasmuch as solenoid valve 21E remains unchanged from the final implementation of the second drive ratio. Moreover, in order to assure that any deactivated torque transfer devices can not be inadvertently activated, they must maintain communication with exhaust.

Figure 7:
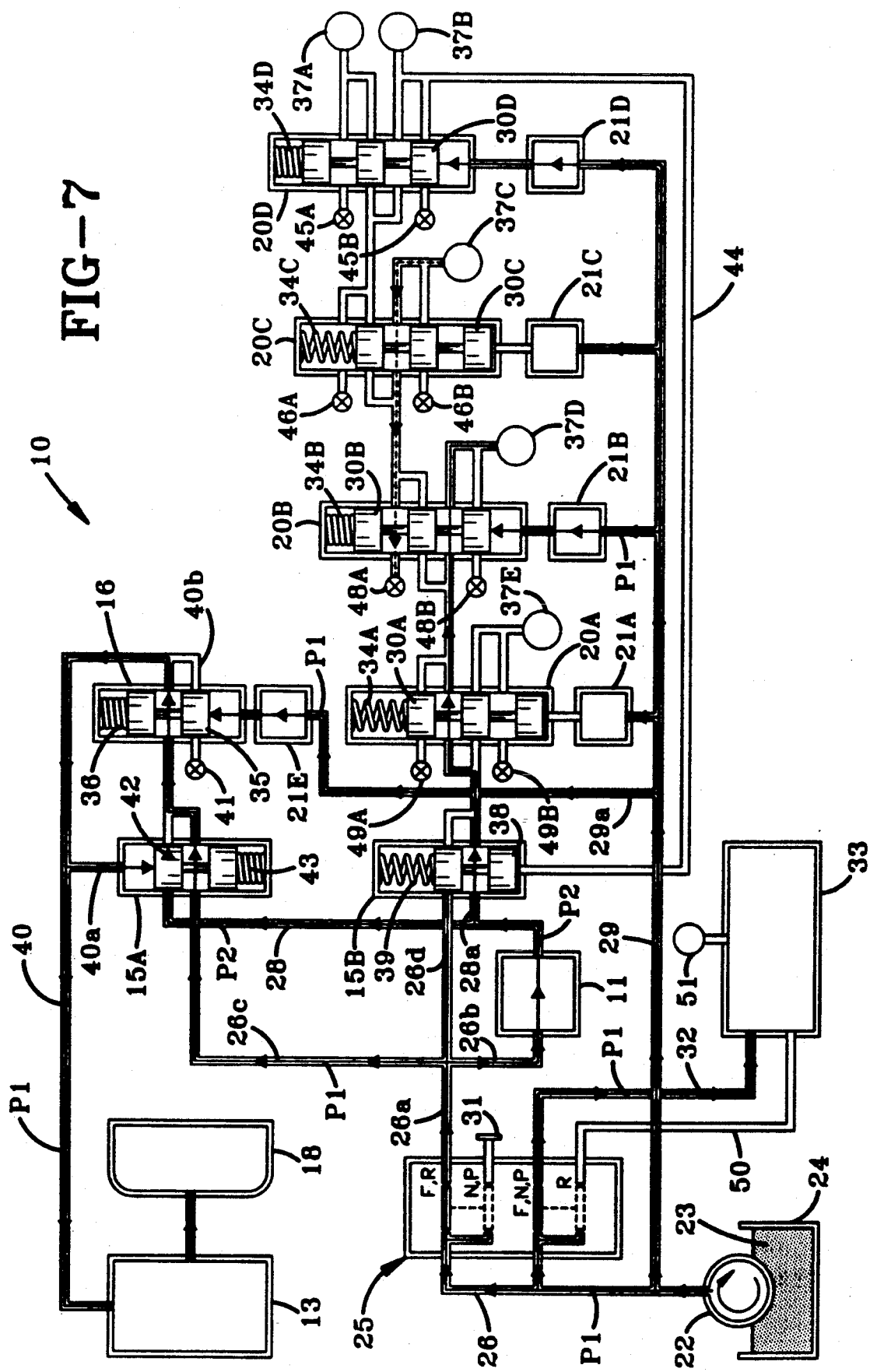
FIG. 7 is a further schematic representation of the hydraulic control system depicted in the previous figures but representing the position of the manually operated shift selector valve assembly, the modulating solenoid, the pressure control gates, the subassembly for controlling the torque converter clutch and the transmission range control subassembly, as well as those conduits through which hydraulic fluid flows or hydraulic pres is transferred, to effect the fourth drive ratio.

To establish a shift from the third drive ratio (FIG. 6) to the fourth drive ratio (FIG. 7), the logic map (FIG. 11) indicates that solenoid valve 21B must be activated. As shown in FIG. 7, activation of solenoid 21B allows the main line pressure P1 to overcome the biasing pressure of spring 34B to force spool member 30B upwardly within relay valve 20B. The upward displacement of spool member 30B permits the hydraulic fluid, which had actuated the torque transfer device 37C, to traverse relay valves 20C and 20B, and to vent out the exhaust port 48A.

The upward displacement of the spool member 30B also permits modulated pressure P2 to pass through pressure control gate 15B and the cascaded relay valves 20A and 20B to actuate the torque transfer device 37D which effects the fourth drive ratio. In this drive ratio, as well, the torque converter clutch 13 remains engaged by full main pressure P1. Moreover, even the torque transfer devices not directly involved in the shift from the third to the fourth drive ratio continue to be vented to exhaust. That is, torque transfer device 37A vents through exhaust port 45A; torque transfer device 37B vents through exhaust port 46A; and torque transfer device 37E vents through exhaust port 49B.

Figure 8:
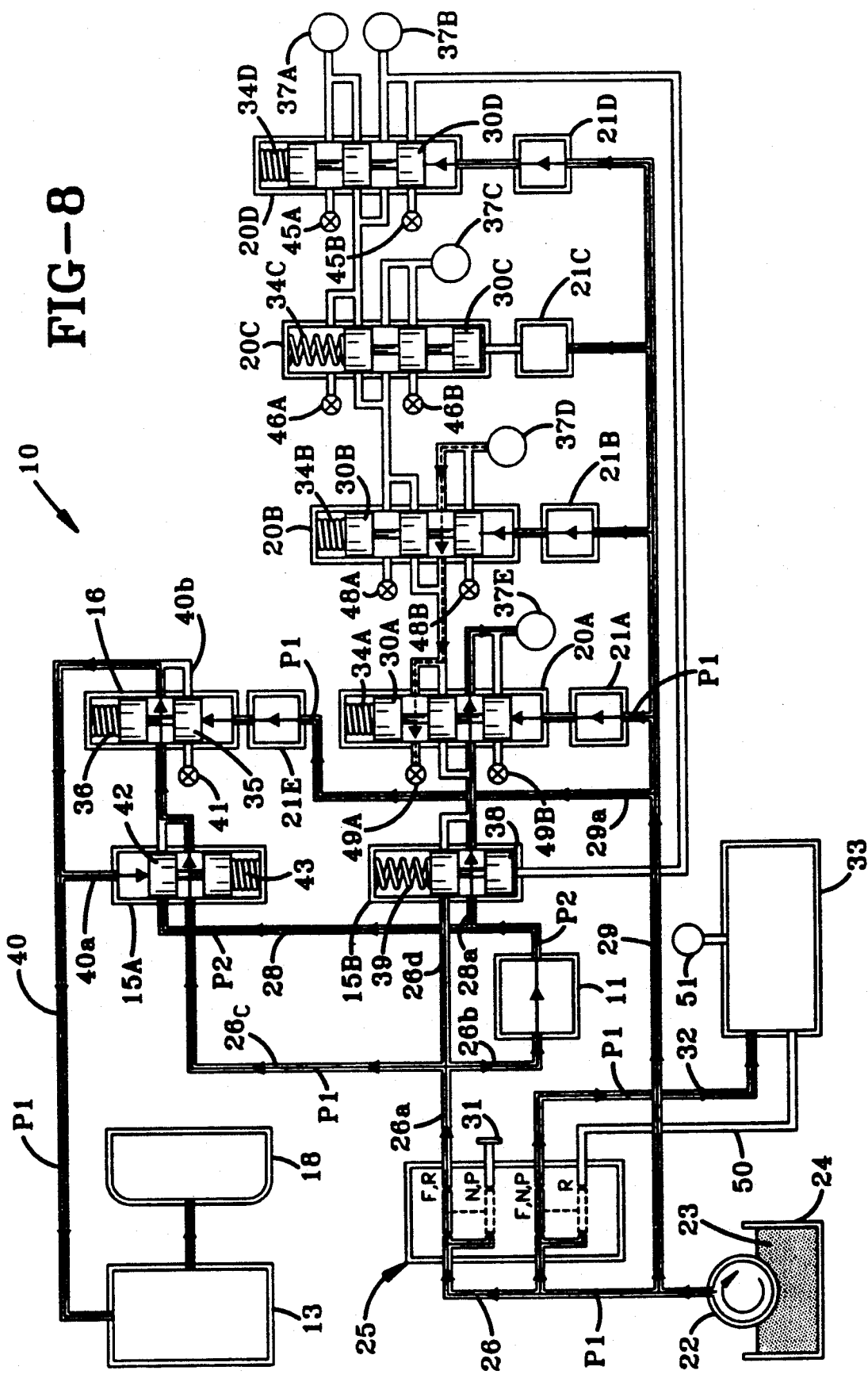
FIG. 8 is a further schematic representation of the hydraulic control system depicted in the previous figures but representing the position of the manually operated shift selector valve assembly, the modulating solenoid, the pressure control gates, the subassembly for controlling the torque converter clutch and the transmission range control subassembly, as well as those conduits through which hydraulic fluid flows or hydraulic pressure is transferred, to effect the fifth drive ratio.

To establish a shift from the fourth drive ratio (FIG. 7) to the fifth drive ratio (FIG. 8), the logic map (FIG. 11) indicates that solenoid valve 21A must be activated. The upward displacement of spool member 30A permits the hydraulic fluid which had actuated the torque transfer device 37D to discharge through relay valve 20A and vent out the exhaust port 49A. The upward displacement of the spool member 30A, occasioned by the admission of main line pressure P1 through solenoid valve 21A, forces the spool member 30A upwardly against the biasing action of spring 34A to permit modulated pressure P2 to pass through pressure control gate 15B and the relay valve 20A to actuate the torque transfer device 37E which effects the fifth drive ratio.

In this drive ratio, as well, the torque converter clutch 13 remains engaged by full main pressure P1. As is the situation with the previous drive ratios, even the torque transfer devices not directly involved in the shift from the fourth to the fifth ratio continue to be vented to exhaust. That is, torque transfer device 37A vents through exhaust port 45A; torque transfer device 37B vents through exhaust port 46B; and, torque transfer device 37C vents through exhaust port 48A.

Figure 9:
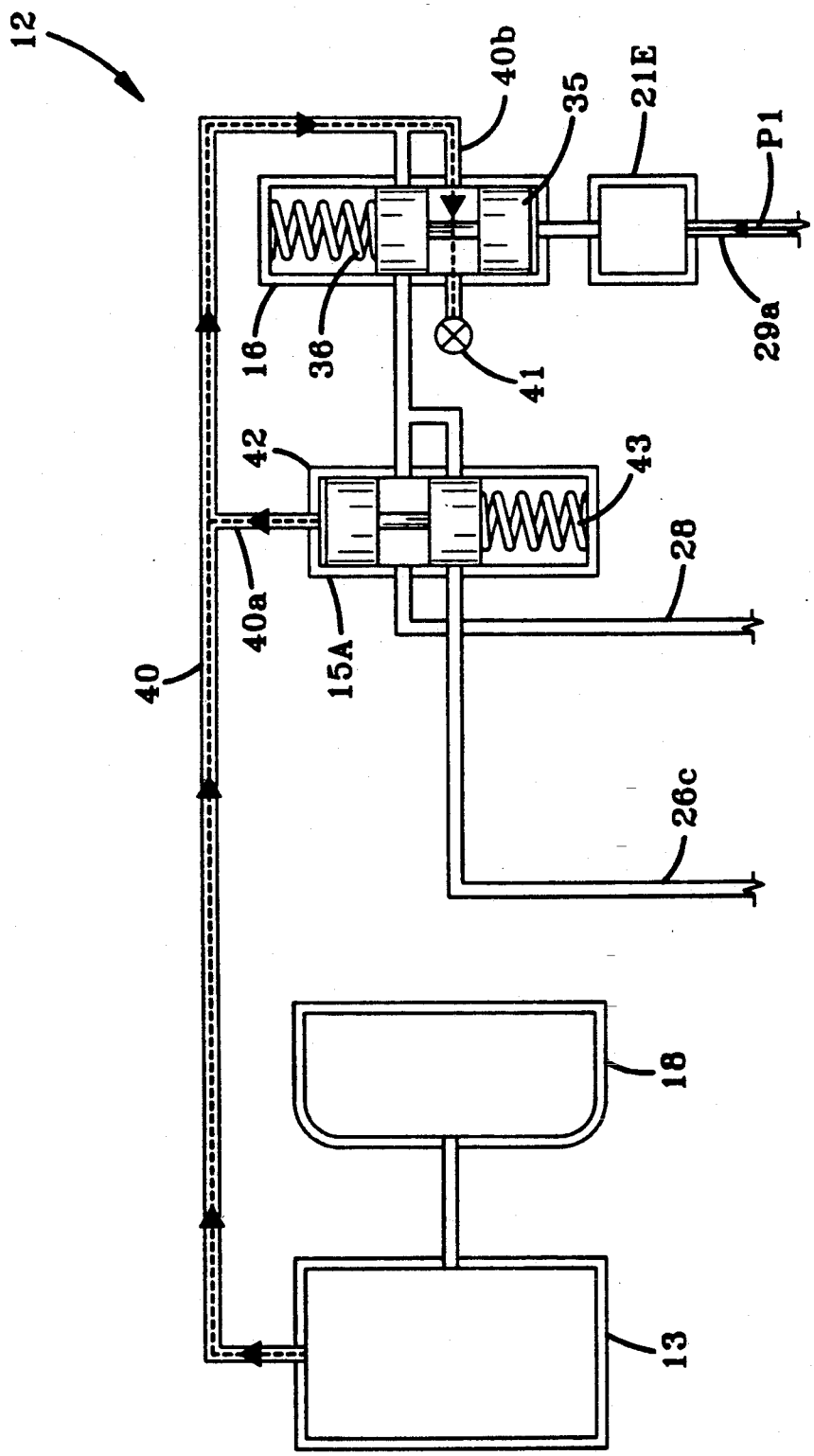
FIG. 9 is a schematic representation of that subsystem which controls the torque converter clutch, the components thereof being disposed as is required to release the torque converter clutch.

The converter clutch 13 can be released in any range and at any time. This release is achieved by deactivating the solenoid valve 21E, which permits the spool member 35 in the torque converter clutch control valve 16 to move downwardly under the biasing pressure of compression spring 36 so that the hydraulic pressure maintaining engagement of the converter clutch 13 can drain outwardly through conduits 40 and 40b, the control valve 16 and into exhaust port 41, as depicted in FIG. 9. As soon as the hydraulic pressure in the converter clutch 13 and conduit 40 falls below the biasing pressure supplied by the compression spring 43, the spool member 42 in the pressure control valve 15A moves upwardly. With the spool members 35 and 42 disposed as shown in FIG. 9 the subsystem 12 is set to block the flow of either main line pressure P1 (through conduit 26a) or modulated pressure P2 (through conduit 28) to the converter clutch 13.

Figure 10:
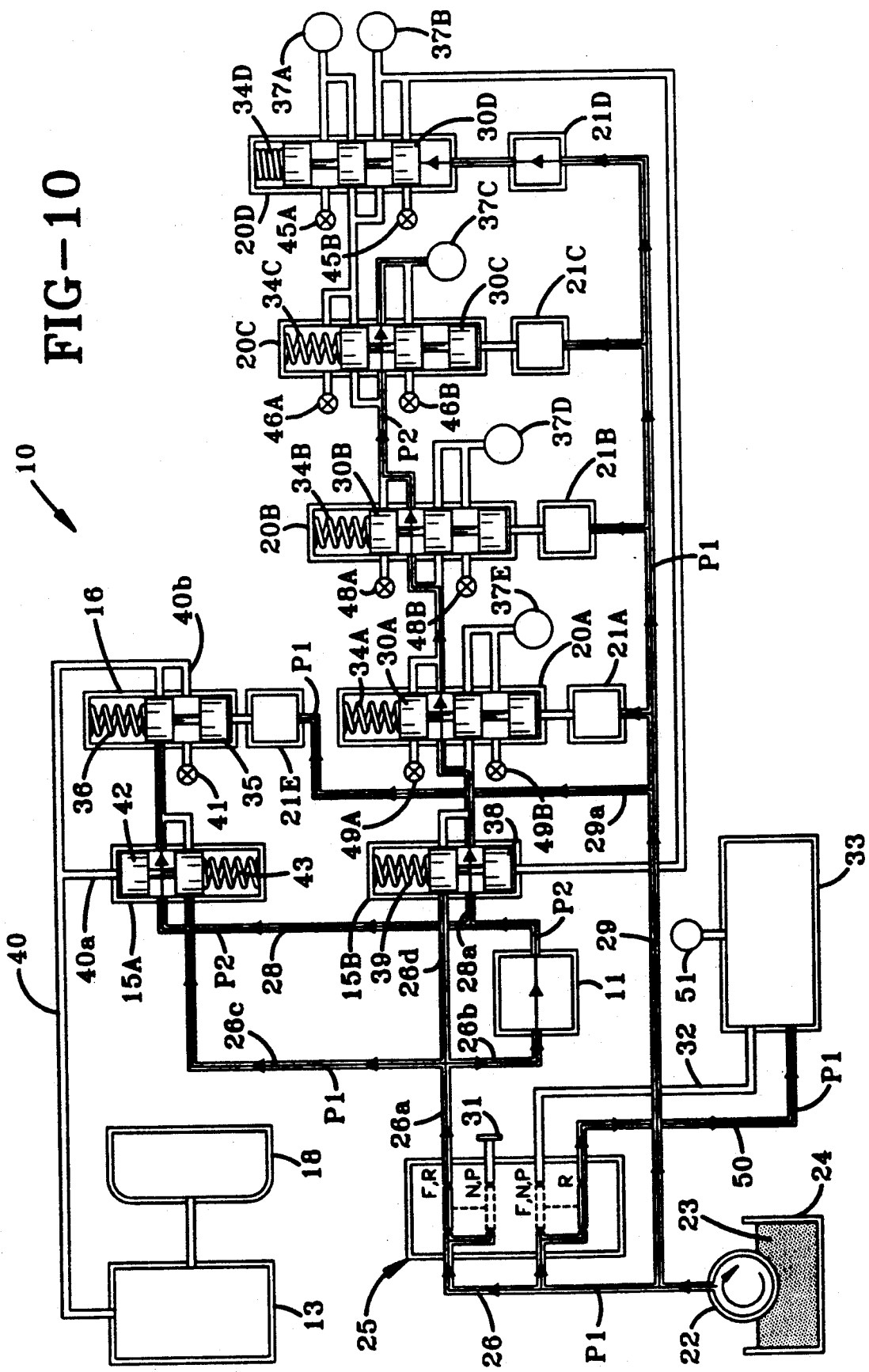
FIG. 10 is a further schematic representation of the hydraulic control system depicted in FIGS. 1 through 8 but representing the position of the manually operated shift selector valve assembly, the modulating solenoid, the pressure control gates, the subassembly for controlling the torque converter clutch and the transmission range control subassembly, as well as those conduits through which hydraulic fluid flows or hydraulic pressure is transferred, to effect a shift from the neutral/park condition to the reverse drive ratio.

To effect a shift from neutral (FIG. 1) to the reverse drive ratio (FIG. 10), the manual shift selector valve assembly 25 is manually actuated to the disposition represented in FIG. 10, solenoid 21C is deactivated, and solenoid 21D is activated. By so actuating the shift selector valve assembly 25, modulated pressure activates the torque transfer device 37C and main line pressure P1 is precluded from entry to either the subsystem 12 or 14. Main line pressure P1 does, however, communicate with the forward/reverse shift fork assembly 33 through conduit 50 to actuate the reverse power servo 51 in a conventional manner. Hence, the novel hydraulic control system 10 can readily accomplish a shift into reverse by a well known structural arrangement without impacting adversely on the overall system itself.

The particular interrelationship of the pressure control gates 15 and the cascaded relay valves 20, precludes the application of torque transfer devices 37 which would result in inadvertent downshifts because the relay valves 20 which actuate the higher drive ratios block the flow of hydraulic fluid, or the transmission of hydraulic pressure, to the relay valves 20 which actuate the lower drive ratios. Therefore, a diagnostic detection and response is not required by the control system 10 to prevent inadvertent downshifts.

From the foregoing, it must be appreciated that a single, pulse width modulating solenoid valve 11 is capable of controlling two subsystems 12 and 14 of a hydraulic control system 10 for an automatic transmission. As determined by the position of two pressure control gates 15A and 15B, modulated pressure P2 may selectively flow to either the torque converter clutch 13 or the torque transfer devices 37 that control the drive ratios.

Alternatively, the modulating solenoid valve 11 may be isolated from either or both subsystems 12 and 14, and full, main line pressure P1 may be used to maintain the torque converter clutch 13 engaged, after it has been actuated by modulated pressure P2, as well as to maintain engagement of that particular torque transfer device 37—torque transfer device 37B, as shown—responsible for actuation of the specific drive ratio during which the torque converter clutch 13 is to be actuated.

Accordingly, while the invention is shown and described with respect to a particular transmission and clutch shift schedule, the invention should not be considered as being limited to the arrangement shown in the drawings. Obviously, other modifications and variations are possible in view of the above teachings such that the invention is limited only by the scope of the appended claims.

The embodiments of the invention in which an exclusive property or privilege is claimed are defined as follows:

1. A hydraulic control system for an automatic vehicular transmission, said system adapted not only to control a plurality of torque transfer devices which effect sequential shifts between the various drive ratios supplied by the transmission but also to control the engagement and release of a torque converter clutch, said system comprising:
   a transmission shift range subsystem having a plurality of solenoid operated relay valves which actuate torque transfer devices that control the shift between the drive ratios provided the transmission;
   a torque converter clutch control subsystem having a solenoid operated relay valve which enables engagement and release of the torque converter clutch;
   each said subsystem having a pressure control gate;
   a source of hydraulic line pressure;
   a modulating solenoid valve;
   conduit means to provide line pressure to each said pressure control gate and said modulating solenoid;
   further conduit means to provide modulated pressure from said modulating solenoid valve to each said pressure control gate; and,
   said solenoid operated relay valves being operable to direct said modulated pressure through one or more of said relay valves to initiate shifting of said transmission and engagement of said torque converter clutch.

2. A hydraulic control system for a power train of a vehicle having a torque converter with a converter clutch selectively engageable to preclude converter slip, the power train also having an automatic transmission which includes a plurality of torque transfer devices which can be engaged and disengaged in response to fluid pressure according to a predefined logic map to provide a plurality of forward drive ratios, the control system being interposed between a source of main line hydraulic pressure and the torque converter clutch as well as the torque transfer devices in the vehicular transmission, said control system comprising, in combination:
   a single modulating solenoid valve to receive hydraulic fluid under main line pressure from the source thereof and to deliver hydraulic fluid at a modulated pressure;
   a first subsystem having a pressure control gate and a torque converter clutch control valve;
   first conduit means to deliver main line hydraulic pressure to said control gate in said first subsystem;
   second conduit means to deliver modulated hydraulic pressure to said control gate in said first subsystem;
   a second subsystem which controls a plurality of torque transfer devices which selectively effect the drive ratios provided by the transmission;
   said second subsystem having a pressure control gate and a plurality of cascaded relay valves, each relay valve having a spool member that is movable between two positions;
   means to bias each spool member to a first position;
   a solenoid valve operatively connected to each said relay valve, said solenoid valves each selectively admitting fluid pressure for moving the spool member against the action of said biasing means to a second position;
   third conduit means to deliver main line hydraulic pressure to said control gate in said second subsystem;
   fourth conduit means to deliver modulated hydraulic pressure to said control gate in said second subsystem;
   means to operate said pressure control gate and said relay valve in said second subsystem to initiate the actuation of said torque transfer devices with modulated pressure;
   means to operate said pressure control gate and said clutch control valve in said first subsystem to initiate the actuation of said torque converter clutch with modulated pressure.

3. A hydraulic control system, as set forth in claim 2, wherein:
said means to operate said pressure control gate and said clutch control valve in said first subsystem maintains engagement of said converter clutch with main line pressure.

4. A hydraulic control system, as set forth in claim 2, wherein:
said means to operate said pressure control gate and said relay valve in said second subsystem maintains the actuated torque transfer device with main line pressure, after the initiation of said actuation with modulated pressure.

5. A hydraulic control system, as set forth in claim 4, wherein: each torque transfer device is vented to exhaust through one of said relay valves, except the actuated torque transfer device.

6. A hydraulic control system for an automatic, vehicular transmission wherein the transmission includes a torque converter clutch and a series of torque transfer devices, both the torque converter clutch and the torque transfer devices being engaged and disengaged in response to hydraulic pressure according to a predefined sequence to provide a plurality of forward drive ratios, with engagement of said torque converter clutch being initiated during engagement of a preselected forward drive ratio, the control system comprising, in combination:
a pump to provide main line hydraulic pressure;
a single modulating solenoid valve;
a fluid-operated, spool valve operating as a first pressure control gate and receiving main line pressure from said pump and modulated pressure from said modulating solenoid valve;
said first pressure control gate selectively delivering main line pressure or modulated pressure to a plurality of fluid-operated relay valves to effect operation of specified torque transfer devices by modulated pressure, said relay valves being interconnected in a cascaded arrangement;
a second pressure control gate receiving main line pressure from said pump and modulated pressure from said modulating solenoid valve for selectively delivering main line pressure or modulated pressure to a torque converter clutch control valve to effect engagement of the converter clutch by modulated pressure.

7. A hydraulic control system, as set forth in claim 6, wherein:
said relay valves are each operated by a solenoid valve.

8. A hydraulic control system, as set forth in claim 6, wherein:
said converter clutch control valve is operated by a solenoid valve.

9. A hydraulic control system for an automatic vehicular transmission, the transmission employing a plurality of fluid-operated torque transfer devices to provide a plurality of drive ratios, the transmission receiving driving power from a torque converter having a converter clutch, the fluid to operate the torque transfer devices, the converter clutch as well as the hydraulic control system being provided by a source of main line hydraulic pressure, said hydraulic control system comprising:

a single modulating solenoid valve;
a transmission shift range subsystem having a pressure control gate and a plurality of cascaded relay valves, each said relay valve being operated by a solenoid valve controlled to admit fluid pressure therethrough in accordance with a predefined logic map;
first conduit means to supply line pressure from a manually operated shift selector valve assembly to said modulating solenoid valve as well as the pressure control gate in said transmission shift range subsystem;
second conduit means to supply modulated pressure from said modulating solenoid valve to the pressure control gate in said transmission shift range subsystem;
means to operate the pressure control gate in said transmission shift range subsystem selectively to admit main line hydraulic pressure or modulated pressure to said cascaded relay valves;
a torque converter clutch control subsystem having a pressure control gate and a fluid-operated torque converter clutch control valve;
third conduit means to supply line pressure from said manually operated shift selector valve assembly to the pressure control gate in said torque converter clutch control subsystem;
fourth conduit means to supply modulated pressure from said modulating solenoid valve to the pressure control gate in said torque converter clutch control subsystem;
said torque converter clutch control valve operated by a solenoid valve controlled to admit fluid pressure therethrough in accordance with a predefined logic map, said torque converter clutch control valve actuating said torque converter clutch by modulated pressure;
fifth conduit means to effect communication between said torque converter clutch control valve and said converter clutch;
said fifth conduit means providing a feedback to said pressure control gate in said torque converter clutch control subsystem to operate said pressure control gate and permit said torque converter clutch control subsystem to maintain engagement of said converter clutch by main line pressure after initial engagement has been completed by modulated pressure.

10. A hydraulic control system, as set forth in claim 9, wherein:
a feedback conduit is provided between that torque transfer device which actuates the drive ratio during which said converter clutch is to be engaged and the pressure control gate in said transmission shift range subsystem to effect a change in state of said pressure control gate whereby main line pressure maintains said torque transfer device in the selected drive ratio while modulated pressure engages the converter clutch.

11. A hydraulic control system, as set forth in claim 9, wherein:
each torque transfer device is vented to exhaust though said cascaded relay valves, except that torque transfer device which is selected for engagement.

* * * * *